(No Model.)

R. M. HUNTER.
ELECTRIC RAILWAY.

No. 440,596. Patented Nov. 11, 1890.

Attest
S. T. Yerkes
Maurice H. Holmes

Inventor

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 440,596, dated November 11, 1890.

Original application filed March 24, 1887, Serial No. 232,352. Divided and this application filed July 23, 1890, Serial No. 360,177. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements, which are fully set forth in the following specification and shown in the accompanying drawings, which form a part thereof.

This application, Case 156, is a division of my application No. 232,352, filed March 24, 1887.

In my applications, Serial Nos. 202,950, filed May 22, 1886, and 215,458, filed October 6, 1886, are described systems of electric railways embodying the principle of operating cars in series circuit, whether in overhead or surface railways. In this application I also contemplate the possible use of the series system as one feature of my invention.

My invention also comprehends an employment of cross-tracks or where one track meets another at an angle, the conductor or conductors of the respective tracks being provided with breaks, gaps, or apertures through which the collector device on the car may pass. The two railways may be operated from the same or different sources of power, if so desired. The gaps or openings in the conductors of the railways may be provided with the switch, if so desired, to bridge the gap and act as a support for the collector device in passing over the said gap in the conductor. The collector device is preferably made of greater length of contact than the opening or gap in the conductor, so that, electrically considered, it does not leave one part of the conductor until it touches the said conductor upon the other side of the gap, thus preventing sparking. The crossing tracks and their specific features may be employed without the use of sectional main conductors, if so desired. The conductors may be overhead conductors arranged upon the surface or placed in a conduit, and one specific feature of my invention relates to these crossing conductors when arranged within the crossing slotted conduit.

My invention also comprehends minor features fully set out hereinafter.

Figure 1:
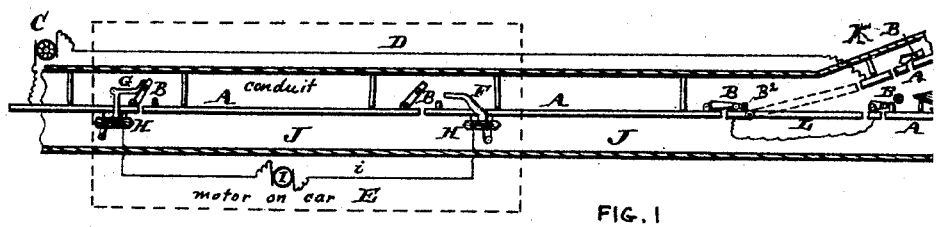
Figure 4:
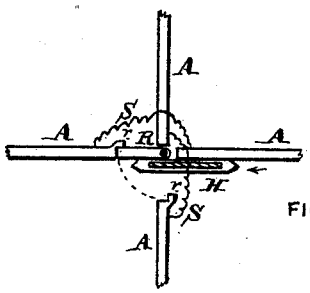
Figure 2:
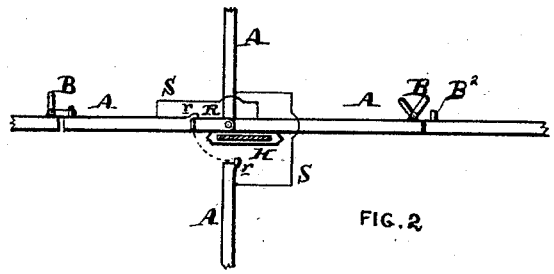
Figure 3:
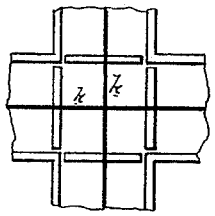

In the drawings, Figure 1 is a plan view of conductors and conduit with the upper part of the latter broken away. Fig. 2 is a plan view of the crossing of two electric railways operating from the same source embodying my invention. Fig. 3 is a plan view of the crossing tracks and slots of the conduits when employed; and Fig. 4 is a similar view to Fig. 2, but in which the two railway conductors have no electrical connection.

A are the conductor-sections and are electrically connected by switches B of any suitable construction. The generator has one pole C connected to one end of the working-conductor, the other pole with the other end of the conductor by a return circuit D, which latter may be buried or suspended or may be the rails. The switches consist of horizontally-swinging levers B', electrically connected to one section A, and when closed, press in contact with parts $B^2$ on the next section A. These switch-levers are operated by the cams F and G on the current-collecting devices H, carried by or moving with the car D, which car is propelled by the electric motor I. These switches may be operated in any convenient manner.

When a conduit J is employed, the conductors A are supported from the walls thereof, being properly insulated therefrom. The conduit may be of any suitable construction and is provided with a slot $k$ along its upper portion.

K represents a branch railway. As shown, it is in series with the main railway, both receiving current from the same source. At the point of branching, or where the said railway meets the main line at an angle, the conductor is provided with a switch L, which may be employed to bridge the gaps between the conductor-sections or conductors of the two railways for the purpose of guiding the collectors from one section to the next or from one conductor portion to the one upon the other side of the gap.

In the construction shown in Fig. 2 the two lines of conductors are shown as united at their juncture by the switch R; but the preferable construction is shown in Fig. 4, where the switch is electrically independent of the conductors. Again, it will be observed that the hinge-point of the switch R is toward the approaching collector, so that the collector or extension in front of it in passing pushes the switch into the proper position for carrying the collector over the break or gap. It is advisable to make this switch in one of the sections A between two of the switches B, if said latter switches are employed, though this location is not an essential feature or necessary. The gaps, if not at the division of two sections of the respective lines of conductors, are bridged by suitable conductors S, as indicated in Fig. 4. In Fig. 2 the two crossing railways are in parallel or multiple and receive current from the same source, or are at least electrically connected, so that current from one source may traverse both lines of conductors. In Fig. 4 the sections of conductors at the crossing-point are electrically independent, so far as the two railways are concerned, the conductors S being employed to electrically bridge the gaps in the respective conductors A. Stops $r$ may be employed to prevent the switch R being moved too far around in its travel.

I do not limit myself to the details of construction herein set out, as they may be modified in various ways without departing from the principles of my invention.

Having now described my invention, what I claim as new, and desire to secure by Letters Patent, is—

1. In two crossing electric railways, the main conductors of each railway severed at its point of crossing the other.

2. In two crossing electric railways, the main conductor of each railway severed at its point of crossing the other, in combination with a bridging-switch to span the gap formed by the severing of the main conductor.

3. In two crossing electric railways, the main conductor of each railway severed at its point of crossing the other, in combination with a pivoted bridging-switch common to both main conductors to span the gap formed in the said main conductors.

4. In two crossing electric railways, the main conductor of each railway severed at its point of crossing the other, in combination with a pivoted bridging-switch common to both main conductors to span the gap formed in the said main conductors and electrically independent of them.

5. In two crossing electric railways, the main conductor of each railway severed at its point of crossing the other, in combination with a pivoted bridging-switch common to both main conductors to span the gap formed in the said main conductors and electrically independent of them and bridging-conductors uniting the ends of the respective main conductors on each side of the gap.

6. In two crossing electric railways, the main conductor of each railway severed at its point of crossing the other, in combination with a loosely-pivoted bridging-switch common to both main conductors and adapted to span the gap formed therein, the pivot-point of said switch being next to the approaching collector of an electrically-propelled vehicle, and an electrically-propelled vehicle having a collecting device to receive current from said conductor and adapted to operate said bridging-switch in passing.

7. In two crossing electric railways, the main conductor of each railway formed in sections united by switches and severed between two successive switches at their points of crossing, in combination with a bridging-switch to span the gap formed by the severing of the main conductors.

8. In an electric railway, the combination of the main conductor formed in sections, switches to connect the sections in series, a gap or opening in one of the sections between two switches, a bridging-conductor electrically connecting the two parts of the divided conductor, and a transverse conductor of a crossing electric railway in line with the gap in the main conductor.

9. In two crossing electric railways, the main conductor of each railway severed at its point of crossing the other, in combination with crossing slotted conduits in which the conductors are located, the said conduits and their slots opening into each other.

10. In two crossing electric railways, the combination of two main divided conductors forming a gap at their juncture for the passage of a collecting device, bridging-conductors to electrically complete the two main conductor-circuits, and a movable current-collecting device of greater length of contact than the width of the gap in the main conductors.

11. In two crossing electric railways, the combination of two main divided conductors forming a gap at their juncture for the passage of a collecting device, bridging-conductors to electrically complete the two main conductor-circuits, a movable current-collecting device of greater length of contact than the width of the gap in the main conductors, and a bridging-switch at the juncture of said main conductors to partly bridge the gap.

12. The combination of two crossing main conductors mechanically severed at their point of crossing to allow the passage of a current-collecting device, a switch at point of juncture to span the gap in either conductor, and suitable stops to limit the throw of the switch.

13. The combination of two crossing main conductors mechanically severed at their point of crossing to allow the passage of a current-collecting device, a switch at point of juncture to span the gap in either conductor and electrically independent of said main conductors, suitable stops to limit the throw of the switch, and a current-collecting device traveling along either of said conductors and having greater length of contact than the width of opening between the switch and conductor.

14. The combination of two slotted conduits having their slots opening into each other, with a main line conductor within each of said conduits and severed at their juncture to allow of the passage of current-collectors, an electrically-propelled vehicle, and a current-collecting device extending from the vehicle through the slot and making a running contact with the conductor therein.

In testimony of which invention I have hereunto set my hand.

R. M. HUNTER.

Witnesses:
ERNEST HOWARD HUNTER,
M. H. HOLMES.